(12) United States Patent
Bouchard

(10) Patent No.: US 7,025,310 B2
(45) Date of Patent: Apr. 11, 2006

(54) MOUSE REST FOR HAND AND WRIST

(76) Inventor: Jae Bouchard, 98 Plant St., New London, CT (US) 06320

( * ) Notice: Subject to any disclaimer, the term of this patent is extended or adjusted under 35 U.S.C. 154(b) by 335 days.

(21) Appl. No.: 10/443,386

(22) Filed: May 23, 2003

(65) Prior Publication Data

US 2005/0056738 A1    Mar. 17, 2005

(51) Int. Cl.
 *B68G 5/00* (2006.01)
(52) U.S. Cl. .......................... 248/118; 248/918; 108/92
(58) Field of Classification Search ................ 248/118, 248/118.1, 118.3, 918; 108/92, 101; D14/459, D14/460, 461
See application file for complete search history.

(56) References Cited

U.S. PATENT DOCUMENTS

| | | | | |
|---|---|---|---|---|
| 238,979 | A * | 3/1881 | Smith | 108/50.14 |
| 789,282 | A * | 5/1905 | Laird | 108/150 |
| 848,991 | A * | 4/1907 | Harvey | 108/148 |
| 1,524,767 | A * | 2/1925 | Vandervoort | 108/76 |
| 2,458,613 | A * | 1/1949 | Lyon | 38/141 |
| 2,641,072 | A * | 6/1953 | Maher | 211/195 |
| 4,018,217 | A * | 4/1977 | Evans | 128/849 |
| 4,069,995 | A * | 1/1978 | Miller | 248/118.1 |
| 4,545,554 | A * | 10/1985 | Latino et al. | 248/118.1 |
| 4,973,176 | A | 11/1990 | Dietrich | |
| 5,433,407 | A | 7/1995 | Rice | |
| 5,490,647 | A | 2/1996 | Rice | |
| 5,562,270 | A | 10/1996 | Montague | |
| 5,868,365 | A | 2/1999 | Hesley | |
| 6,276,646 | B1 * | 8/2001 | Gaba | 248/118 |
| 2005/0011080 | A1 * | 1/2005 | Gunderson et al. | 33/645 |

FOREIGN PATENT DOCUMENTS

DE    19903982 A1 *    7/2000

* cited by examiner

Primary Examiner—Korie Chan
(74) Attorney, Agent, or Firm—Mark E. Pochal

(57) ABSTRACT

A mouse rest for hand and wrist device for reducing repetitive stress injuries from extended use of a computer mouse device is disclosed which includes a hand and wrist support region consisting of a resting plate, generally square in shape, having three square corners and one outwardly rounded corner. The resting plate has a top and bottom surface and is elevated by at least three posts attached at the square corners and extending downward to a nonskid pad. A nonskid pad is affixed to a base. The computer mouse device is placed under the resting plate at the rounded corner and the user accesses the mouse with fingers only while the hand and wrist remain on a horizontal plane and totally relaxed on the resting plate. The disclosed device eliminates all upward or downward flexion of the users wrist which is a main cause of repetitive stress injuries.

5 Claims, 2 Drawing Sheets

MOUSE REST FOR HAND AND WRIST

BACKGROUND OF THE INVENTION

1. Field of the Invention

The present invention relates generally to computer accessories and more particularly, to apparatus for operation of a computer known as a computer pointer device or mouse. More specifically, the invention is a hand and wrist support device designed to allow operation of mouse with user's fingers with hand and wrist positioned on said support device remaining on a horizontal plane, stationery and relaxed minimizing repetitive strain injuries associated with prolonged use of computers.

2. Description of the Prior Art

As the use of computers, both recreationally and for business purposes continues to increase, so to has the incidence of repetitive strain injuries such as carpal tunnel syndrome or tendonitis, to name a couple of the many types of injuries associated with repetitive strain. These injuries are a result of repetitive strain and stress placed on the nerves and tendons of the arm and wrist and is compounded by wrist posture in use of the keyboard or in operating a mouse device. The improvement of this invention is that the hand and wrist support device maintains the wrist and hand in a straight and level position preventing any downward or backward flexion of the wrist at all times. This allows the hand and wrist muscles and tendons to be relaxed at all times while the mouse device is operated and maneuvered solely by the user's fingers.

Various devices have been devised for use with a mouse to alleviate the stress-related problems associated with repetitive use, but none of these devices completely alleviate stress on the wrist muscles as the operation of these devices require or permit flexion of the wrist. It is well known that associated injuries are caused from posture of the user's hand and wrist; more specifically bending of the wrist to operate the mouse device. The prior art wrist supports for use with a computer mouse do not eliminate bending of the wrist. The palm rest disclosed in U.S. Pat. No. 5,433,407 to Rice issued Jul. 18, 1995 has a curvilinear section which the user rests their palm. This device does not eliminate totally all bending of the wrist in the operation of the computer mouse as the wrist and hand are not supported. This device also has the disadvantage of becoming uncomfortable after extended periods of use.

Other patented examples are disclosed in U.S. Pat. No. 4,973,176 to Dietrich issued Nov. 27, 1990, U.S. Pat. No. 5,490,647 to Rice issued Feb. 13, 1996, U.S. Pat. No. 5,562,270 to Montague issued Oct. 8, 1996, U.S. Pat. No. 5,868,365 to Hesley dated Feb. 9, 1999. Again, the disadvantage of these devices is that stress is placed on the the wrist muscles as the user's wrist is in a flexed position when operating the computer mouse.

The device of this invention is structurally different from the entire prior art listed in that the hand and wrist is elevated to a horizontal position, eliminating any flexion of the wrist and permitting the muscles and tendons of the hand and arm to be completely relaxed all times in the operation of the computer mouse device.

It was with knowledge of the foregoing disclosures representative of the state of the state of the art that the present invention was conceived and has now been reduced to practice.

SUMMARY OF THE INVENTION

The present invention relates to a device for use with computer pointing devices (mouse) to support the user's hand and wrist to minimize the stress-related injuries by preventing upward or downward flexion of the wrist and also allowing maximum use of the mouse device. The present invention provides an elevated support region for resting of the user's hand and wrist, leaving only the user's fingers extending beyond the support region to manipulate the mouse. The hand and wrist muscles remain in a relaxed and non-movement state at all times and only the user's fingers are in a movement state operating the mouse.

The support region is a flat surface of sufficient diameter to accommodate the user's hand and wrist and can vary in dimensions depending on the users hand and wrist sizes.

The support region consists of a flat resting plate, generally square in shape, with three-square corners and the fourth corner being outwardly rounded to receive the computer mouse and permit operation and movement of the mouse by the user's fingers. The rounded edge of the support region has the further benefit of greater comfort to the palm of the user's hand as the weight is evenly distributed along the flat surface of the support region.

The support region is elevated by at least three (3) posts to receive the mouse device and more significantly to support the hand and wrist in a horizontal plane at all times maintaining the hand and wrist muscles in a relaxed state. In the preferred embodiment, the length of the posts is at least three and one-half (3½) inches.

In the preferred embodiment, the support region has a textured surface to provide further comfort permitting longer periods of continuous use.

The support region and posts are secured to a nonskid pad that extends under the support region and extends outward a sufficient distance for positioning of the computer mouse device. The nonskid pad is secured to a base that is lightweight and easily moveable to the users desired position for operation of the computer mouse device and prevents seperation of the hand and wrist device from the computer mouse and easy moveability of the mouse.

Features of the mouse rest for hand and wrist include the following:

- It allows for greater periods of continuous use of the computer mouse as the user's hand and wrist are in a continuous relaxed position;
- It may be fabricated of lightweight plastic or other lightweight materials assuring an inexpensive device and aesthetically pleasing;
- A preferred embodiment could be injection-molded from transparent polycarbonate;
- It will further reduce the occurrence of repetitive strain injuries and carpal tunnel syndrome.

An object of the invention, then is to provide an improved device to use along with a computer mouse, which is inexpensively made but durable and aesthetically pleasing.

A further object of the invention is to provide an improved device that keeps the user's hand and wrist in a constant horizontal and relaxed position as the user's fingers do all the manipulation of the computer mouse.

Still a further object of the invention is to permit longer extended periods of continuous use of a computer mouse with less fatigue and less risk of repetitive strain injuries or carpal tunnel syndrome.

Other and further features, advantages, and benefits of the invention will become apparent in the following description taken in conjunction with the following drawings. It is to be understood that the foregoing general description and the following detailed description are exemplary and explanatory but are not restrictive of the invention.

The accompany drawings which are incorporated in and constitute a part of this invention, illustrate one of the embodiments of the invention, and together with the description, serve to explain the principles of the invention in general terms. Like numerals refer to like parts throughout the disclosure.

DESCRIPTION OF THE PREFERRED EMBODIMENT

Figure 1:
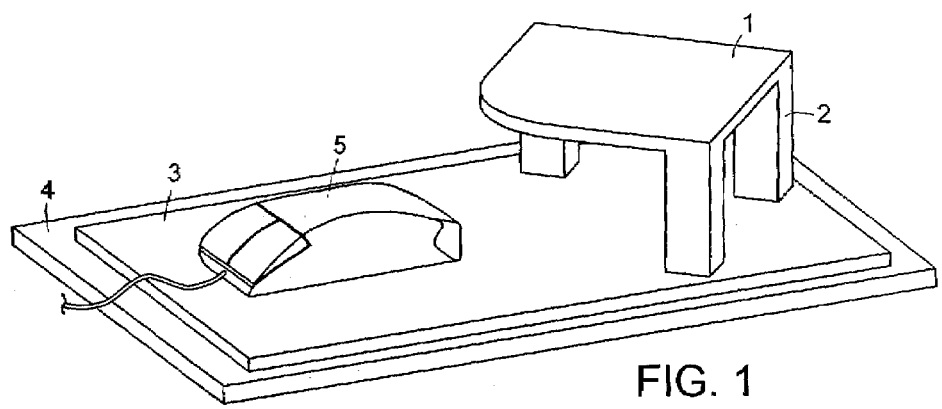
FIG. 1 is a perspective view of individually the hand and wrist support device affixed to the nonskid pad and base and a computer mouse device in non-operational position.
Figure 2:
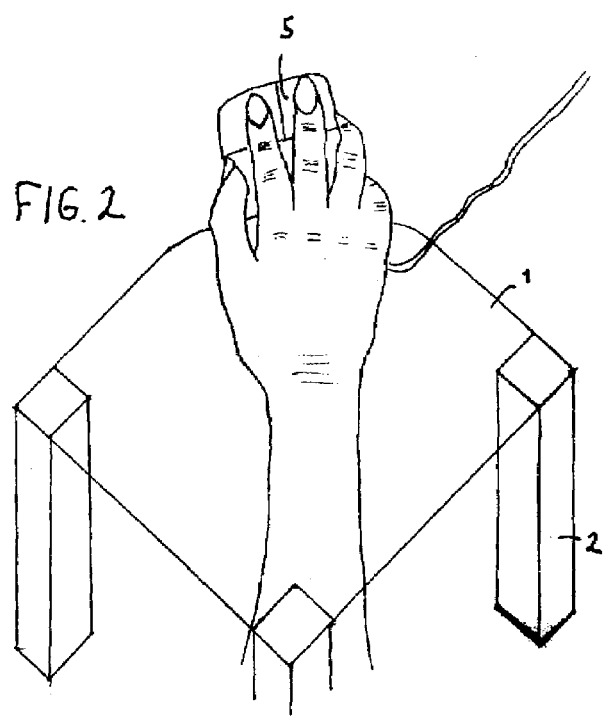
FIG. 2 is an overview perspective illustrating the elevated hand and wrist support region in a horizontal plan and access to computer mouse device beneath a portion of the support region by the user's fingers.
Figure 3:
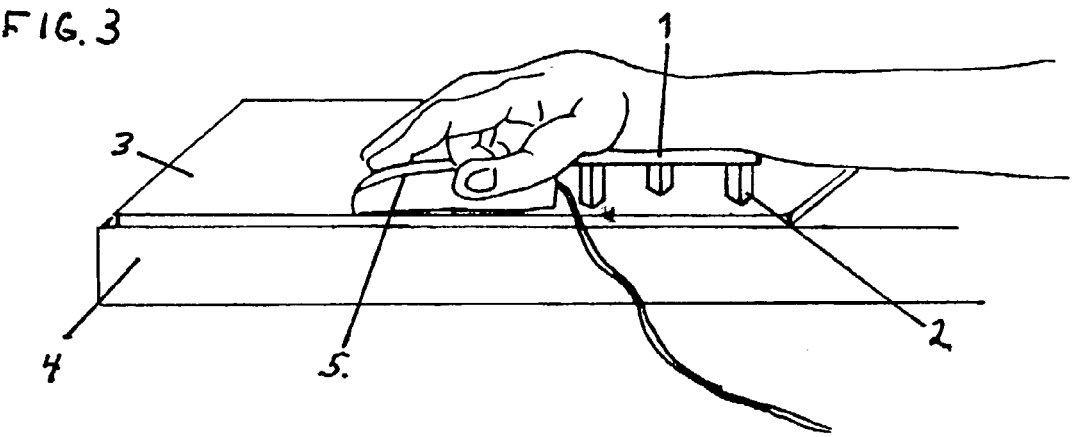
FIG. 3 is a diagrammatic side elevation of an operational use of the mouse rest for hand and wrist device.

The hand and wrist support region consists of a resting plate (1) upon which the hand and wrist of the user is supported and only the fingers move and control the computer mouse. (5) The resting plate (1) has a flat top and bottom surface and is generally square in shape. The resting plate (1) is a suitable size to accommodate varying sizes of user's hands and wrist. In a preferred embodiment the size of said resting plate is six inches (6) by six inches (6) and one-quarter (¼) thick. The resting plate (1) has three square corners and a fourth outwardly curved corner.

The outwardly curved corner allows access to the computer mouse device (5) by the user's fingers. Movements of the computer mouse device (5) are done by the users fingers only while the hand and wrist remain in a horizontal plane and in a relaxed state on resting plate (1).

The hand and wrist support region is elevated by at least three post (2) affixed to the bottom surface at the square corners of resting plate (1). The posts extend downwardly and are affixed to a nonskid pad (3), which is also affixed to a base (4). The desired height of the posts (2) in the preferred embodiment is three and one-half inches to maintain a horizontal plane of the hand and wrist during operation of the computer mouse device (5) and preventing any downward or upward flexion the user's wrist.

What is claimed is:

1. A mouse rest for hand and wrist device comprising:
   (a). a resting plate, generally square shaped having a top and bottom surface and three square corners and one outwardly rounded corner;
   (b). a nonskid pad affixed to a base; and
   (c). a plurality of posts positioned perpendicularly between the resting plate and the nonskid pad, having a top end affixed to the bottom surface of the resting plate and a bottom end affixed to the nonskid pad elevating the resting plate a sufficient height to maintain a horizontal plane wherein a computer mouse device is adapted to to be positioned under the resting plate at the area of the outwardly rounded corner.

2. The mouse rest for hand and wrist device of claim 1, wherein the plurality of posts are three and one-half inches in length and are affixed to the resting plate on the bottom surface at the three square corners.

3. The mouse rest for hand and wrist device of claim 1, wherein the nonskid pad is positioned parallel beneath the resting plate and extends beyond the outwardly rounded corner of the resting plate.

4. The mouse rest for hand and wrist device of claim 1, wherein the top surface of the resting plate is textured.

5. The mouse rest for hand and wrist device of claim 1, wherein said device is made of a polycarbonate material.

* * * * *